United States Patent [19]
Godec et al.

[11] Patent Number: 5,468,074
[45] Date of Patent: Nov. 21, 1995

[54] BEARING ASSEMBLY

[75] Inventors: Maksimilijan Godec, Torrington; John A. Larson, New Hartford; Walter P. Waskiewicz, Bristol, all of Conn.

[73] Assignee: The Torrington Company, Torrington, Conn.

[21] Appl. No.: 332,178

[22] Filed: Oct. 31, 1994

[51] Int. Cl.[6] .................................................. F16C 23/08
[52] U.S. Cl. ........................................ 384/495; 384/498
[58] Field of Search ................................ 384/495, 498, 384/558, 536

[56] References Cited

U.S. PATENT DOCUMENTS

| | | | |
|---|---|---|---|
| 1,844,552 | 2/1932 | Bailey | 384/498 |
| 3,224,821 | 12/1965 | Barr | 384/484 |
| 3,446,542 | 5/1969 | Whitehurst | 384/477 |
| 4,025,135 | 5/1977 | Hishida | 384/498 |
| 4,094,559 | 6/1978 | Slusarski | 384/498 |
| 4,185,880 | 1/1980 | Shiomi et al. | 384/498 |
| 4,668,110 | 5/1987 | Égető et al. | 384/536 |
| 4,708,499 | 11/1987 | Löser et al. | 384/539 |
| 5,028,151 | 7/1991 | Nisley | 384/477 |

FOREIGN PATENT DOCUMENTS

| | | | |
|---|---|---|---|
| 56614 | 3/1987 | Japan | 384/495 |
| 8102497 | 12/1982 | Netherlands | 384/495 |
| 50950 | 2/1922 | Sweden | 384/498 |
| 640954 | 8/1950 | United Kingdom | 384/495 |
| 640917 | 8/1950 | United Kingdom | 384/498 |

*Primary Examiner*—Thomas R. Hannon
*Attorney, Agent, or Firm*—John C. Bigler

[57] ABSTRACT

A bearing assembly has a stationary housing with a bore with a constant inside diameter. The non-metallic or powdered metal outer assembly is fixedly retained in the housing. A non-metallic or powdered metal inner assembly ring is slidably retained in the outer assembly ring. A ball bearing is retained by the inner assembly ring.

4 Claims, 1 Drawing Sheet

BEARING ASSEMBLY

BACKGROUND OF THE INVENTION

This invention relates generally to bearing assemblies. More particularly, this invention is a new bearing structure which eliminates the need for bearing structures which are now currently made and include precision machined metallic spherical forms.

Self-aligning housed bearing units typically are manufactured with bearings that have a spherical form on the outside diameter of the outer rings and are of sufficient width to provide for the inclusion of annular grooves into which seals or shields can be installed. Also, the metallic housing has a corresponding spherical form machined into its bore to facilitate bearing assembly and to allow misalignment. The manufacture of a spherical bearing ring and spherical-shaped housing bore are extremely costly, and require considerable precision to insure proper fit and functionality. Thus, a bearing assembly which does not have a metallic housing with a spherical form would be highly desirable.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

Briefly described, the bearing assembly of this invention comprises a stationary housing with a bore having an inner surface of constant inside diameter throughout its length. A non-metallic or powdered metal outer assembly ring is fixedly retained in the stationary housing bore. This outer assembly ring has an outer surface complementary with the stationary housing inner surface and also has a curved inner surface therearound. A non-metallic or powdered metal inner assembly ring is slidably retained in the outer assembly ring bore. The inner assembly ring has a curved outer surface complementary with the outer assembly ring curved inner surface and an annular groove around the inner surface. The base of the annular groove provides an annular surface of constant diameter throughout the length of the groove. A bearing is retained by the non-metallic or powdered metal inner assembly ring groove. This is done by providing an outside surface to the bearing ring which is complementary with the base surface of the inner assembly ring annular groove.

The foregoing and other aspects will become apparent from the following detailed description of the invention when considered in conjunction with the accompanying drawing Figure.

BRIEF DESCRIPTION OF THE DRAWING FIGURE

FIG. 1, the only Figure in the drawing, is a side elevational view partly in section of the bearing assembly.

DETAILED DESCRIPTION

Figure 1:
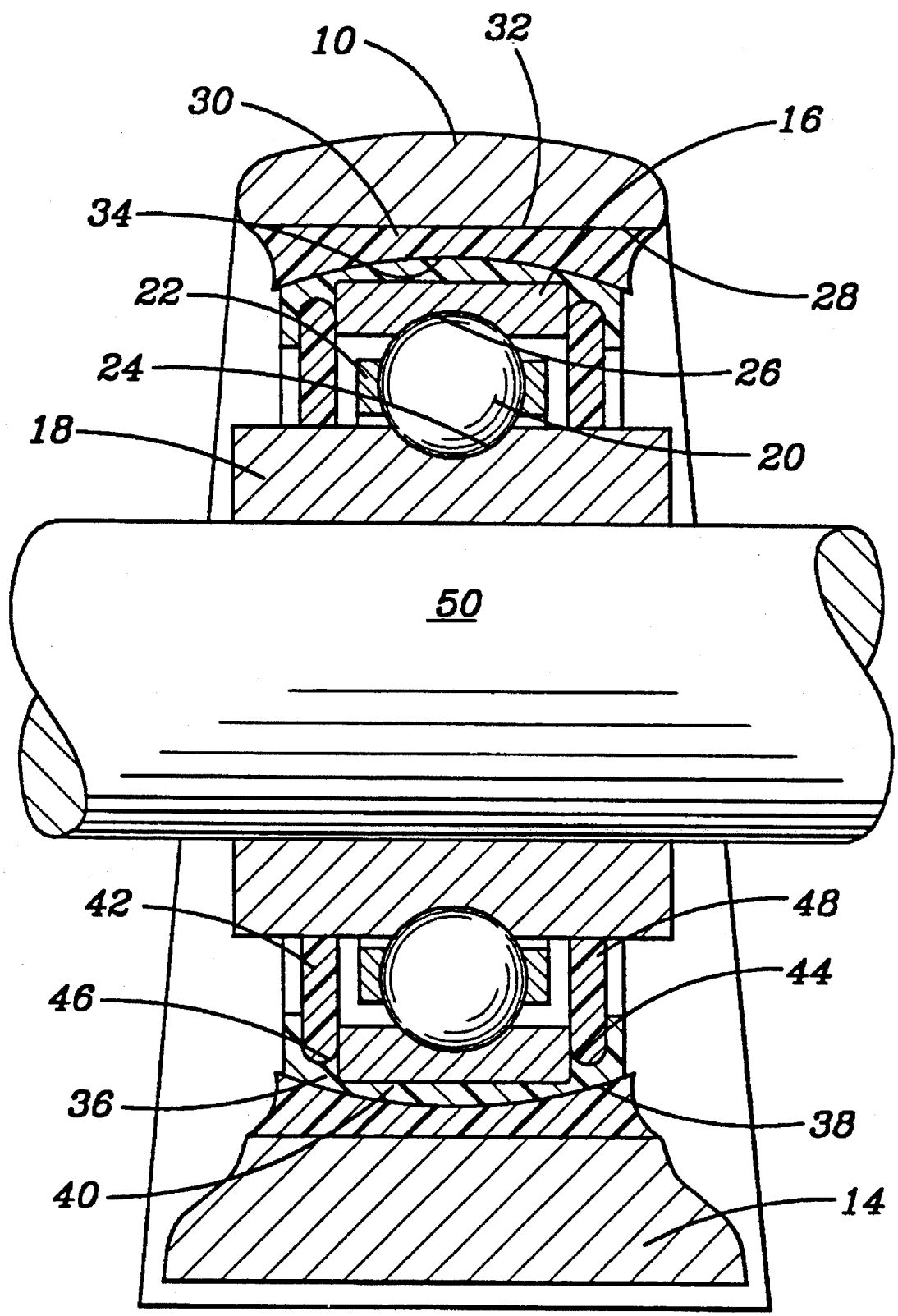

Referring to the Figure, the bearing assembly includes a housing 10 which is a metal housing and includes a base 14 having means (not shown) for attachment of the assembly to a supporting surface. A ball bearing is included in the bearing assembly. The ball bearing has an outer ring 16 and an inner ring 18. The balls 20 retained by the ball cage 22 are in rolling contact with the raceway 24 on inner ring 18 and the raceway 26 on outer ring 16.

The stationary housing 10 has a bore 28 extending entirely through the stationary housing. The surface of the housing bore has a constant inside diameter throughout its length, hence, the housing can be manufactured much easier and a lot cheaper than the conventional housing bores which have concave or spherically shaped inside surfaces.

A single non-metallic outer assembly ring 30 is fixedly retained in the housing 10. The outer assembly ring 30 has an outer surface 32 which is complementary to and has substantially the same axial length as the stationary housing 10 inner surface. The outer assembly ring 30 has a concave inner surface 34 around its entire circumference.

A single non-metallic inner assembly ring 36 is slidably retained in the outer assembly ring 30. The inner assembly ring 36 has a generally spherical outer surface 38 complementary with the outer assembly concave inner surface 34.

An annular groove extends entirely around the inner surface of the inner assembly ring. The base 40 of the annular groove provides an annular surface of constant diameter throughout its length. The bearing metal ring 16 has an outer surface which is complementary with the base surface 40 of the groove in the inner assembly ring. Thus, the inner assembly ring groove serves to retain the ball bearing in the inner assembly ring.

Seals 42 and 44 may be fit into grooves 46 and 48 respectively adjacent each axial end of the inner assembly ring.

Note that the outside surface of the ball bearing ring 16 has the same diameter throughout its length. Hence, the conventional type bearing ring with the spherically shaped outer surface is eliminated.

The non-metallic outer and inner assembly rings may be made of various materials. For example, they could be made of molded polymer. They could also be made of nylon or of a self-lubricating material. The outer and inner assembly rings could also be made from formed powder metal components.

Having described the invention, what is claimed is:

1. A bearing assembly comprising:
    a metal stationary housing having a bore of constant diameter extending entirely through the housing;
    a single outer assembly ring fixedly retained in the stationary housing bore, said outer assembly ring having an outer surface complementary to and substantially the same length as the surface of said bore and a concave inner surface around its entire circumference;
    a single inner assembly ring slidably retained in the outer assembly ring, said inner assembly ring having a generally spherical outer surface complementary with and in full contact with the outer assembly ring concave inner surface, and an annular groove around its inner surface, the base surface of the groove providing an annular surface of constant diameter throughout its length; and
    a bearing having a metal ring with an inner surface shaped to serve as a raceway for rolling members in the bearing, said bearing ring having an outside surface complementary with the base surface of the inner assembly ring annular groove.

2. A bearing assembly in accordance with claim 1 wherein:

the outer assembly ring and the inner assembly ring are made of non-metallic materials.

3. A bearing assembly in accordance with claim 1 wherein:

the outer assembly ring and the inner assembly ring are made from powdered metal.

4. A bearing assembly in accordance with claim 1 wherein:

the outer assembly ring and the inner assembly ring are made of molded polymers.

* * * * *